United States Patent
Zaveruha et al.

(10) Patent No.: US 11,064,597 B1
(45) Date of Patent: Jul. 13, 2021

(54) POWER INTERRUPTION BLUETOOTH LOW ENERGY MESH PAIRING

(71) Applicant: ABL IP Holding LLC, Atlanta, GA (US)

(72) Inventors: Ryan A. Zaveruha, Trumbull, CT (US); Robert W. Hamlin, Monroe, CT (US)

(73) Assignee: ABL IP Holding LLC, Atlanta, GA (US)

( * ) Notice: Subject to any disclaimer, the term of this patent is extended or adjusted under 35 U.S.C. 154(b) by 0 days.

(21) Appl. No.: 17/077,103

(22) Filed: Oct. 22, 2020

(51) Int. Cl.
*H05B 47/19* (2020.01)
*H05B 47/17* (2020.01)

(52) U.S. Cl.
CPC ............. *H05B 47/19* (2020.01); *H05B 47/17* (2020.01)

(58) Field of Classification Search
CPC ...... H05B 47/10; H05B 47/105; H05B 47/16; H05B 47/115; H05B 47/17; H05B 47/175; H05B 47/185; H05B 47/19
See application file for complete search history.

(56) References Cited

U.S. PATENT DOCUMENTS

| | | | |
|---|---|---|---|
| 10,841,955 B2 * | 11/2020 | Tsai | H04L 5/0048 |
| 10,849,210 B2 * | 11/2020 | Nogueira-Nine | H05B 47/19 |
| 10,932,349 B1 * | 2/2021 | Westrick, Jr. | H05B 47/16 |
| 2010/0141153 A1 * | 6/2010 | Recker | H05B 47/19 315/149 |
| 2010/0204847 A1 * | 8/2010 | Leete, III | H04W 84/00 700/295 |
| 2016/0330825 A1 * | 11/2016 | Recker | H05B 47/19 |
| 2019/0261493 A1 * | 8/2019 | Dolan | H05B 47/105 |

* cited by examiner

*Primary Examiner* — Thai Pham
(74) *Attorney, Agent, or Firm* — Kilpatrick Townsend & Stockton LLP

(57) ABSTRACT

A system includes a control device and a plurality of lighting fixtures configured to receive power through the control device. Each lighting fixture includes a receiver and a memory, and is configured to: scan for a first message transmitted by the control device, the first message containing a unique identifier of the control device; receive the first message and store the unique identifier of the control device in the memory; sense a power interrupt to the lighting fixture initiated by the control device within a specified period of time after receipt of the first message from the control device; and transmit a second message including the unique identifier of the control device, the second message indicating that the lighting fixture is in a provisioning mode.

20 Claims, 9 Drawing Sheets

POWER INTERRUPTION BLUETOOTH LOW ENERGY MESH PAIRING

BACKGROUND

Unless otherwise indicated herein, the materials described in this section are not prior art to the claims in this application and are not admitted to be prior art by inclusion in this section.

Lighting systems include intelligent lighting fixtures (e.g., luminaires), sensors (e.g., occupancy sensors), and lighting controllers. Various portions of a lighting system may be formed into different networks, where each intelligent light fixture communicates with a controller for the specific network. For example, a control device (e.g., a wall station) may wirelessly communicate with and control a set of light fixtures in a particular room. In some cases, the networks may be formed automatically.

Conventional methods of automatically forming a network via wireless communication can be at risk of including devices from adjacent rooms which should not be part of the network. Various methods are employed to avoid this issue which often involve user intervention. For example, coded light signals from the light fixtures in conjunction with a mobile device application may be used help a technician identify and program the lighting fixtures as part of a network. Other lighting systems requires that a technician uses a laser to trigger light sensors in the lighting fixtures to identify and program them as part of a network.

Often, initial set up (e.g., commissioning) of lighting fixtures and switches in a lighting installation is performed by a technician having little familiarity with the intelligent lighting system. Thus, the commissioning procedure should be uncomplicated to minimize set up errors.

SUMMARY

Systems and methods for commissioning lighting control systems are provided.

According to various aspects there is provided a system. In some aspects, the system may include a control device; and a plurality of lighting fixtures configured to receive power through the control device. Each lighting fixture of the plurality of lighting fixtures may include a receiver; and a memory. Each lighting fixture of the plurality of lighting fixtures may be configured to scan for a first message transmitted by the control device, the first message containing a unique identifier of the control device; receive the first message and store the unique identifier of the control device in the memory; sense a power interrupt to the lighting fixture initiated by the control device within a specified period of time after receipt of the first message from the control device; and transmit a second message including the unique identifier of the control device, the second message indicating that the lighting fixture is in a provisioning mode. The control device may be further configured to provision the plurality of lighting fixtures to form a mesh network. The unique identifier is a Media Access Control (MAC) address of the control device.

Upon an initial power-up, each lighting fixture of the plurality of lighting fixtures may transmit messages indicating a request to join a network. Messages transmitted by the control device and messages transmitted by the plurality of lighting fixtures may be Bluetooth Low Energy (BLE) advertisements.

The control device may be configured to delay sending the first message in response to receiving a message from another control device. The control device may be a continuously powered wall station. Transmission of the first message to the plurality of lighting fixtures may be initiated by a specified user input to a user interface of the continuously powered wall station.

Each lighting fixture may be configured to determine a value of a time duration between receiving the first message and initiation of the power interrupt, store the value in the memory, and transmit the value to the control device as a requirement to join the mesh network. Each lighting fixture within communication range of the control device may be further configured to extend the mesh network by retransmitting messages received from the control device to remote lighting fixtures outside the communication range of the control device.

The control device may include a switch configured to receive power from a power source; and a controller configured to communicate with the switch, the controller may be further configured to generate control signals to the switch to cause the switch to supply and interrupt the power to the plurality of lighting fixtures.

According to various aspects there is provided a method for configuring a wireless sensor of a lighting control network. In some aspects, the method may include scanning, by one or more lighting fixtures, for a first message transmitted by a control device, the first message containing a unique identifier of the control device; receiving, by the one or more lighting fixtures, the first message and storing the unique identifier of the control device in a memory; sensing, by the one or more lighting fixtures, a power interrupt initiated by the control device within a specified period of time after receipt of the first message from the control device; transmitting, by the one or more lighting fixtures, a second message including the unique identifier of the control device, the second message indicating that the lighting fixture is in a provisioning mode; and provisioning, by the control device, the one or more lighting fixtures to form a mesh network.

The method may further include transmitting, by the by the one or more lighting fixtures upon initial power-up, messages indicating a request to join a network. Messages transmitted by the control device and messages transmitted by the one or more lighting fixtures may be Bluetooth Low Energy (BLE) advertisements.

The method may further include receiving, by the control device, a specified user input to initiate transmission of the first message, and initiating the first message transmitted by the control device in response to a specified user input to a user interface of the control device.

The method may further include delaying, by the control device, sending the first message in response to receiving a message from another control device.

According to various aspects there is provided non-transitory computer readable medium having stored therein instructions for making one or more processors execute a method for provisioning lighting fixtures. In some aspects, the non-transitory computer readable medium may include instructions for causing one or more processors to perform operations including: transmitting, by a control device, a first message containing a unique identifier of the control device; initiating, by the control device, a power interrupt to one or more lighting fixtures; receiving, by the control device, a second message including the unique identifier of the control device from each of the one or more lighting fixtures, the second message indicating that each of the lighting fixtures is in a provisioning mode; and provisioning, by the control device, the one or more lighting fixtures to form a mesh network.

The non-transitory computer readable medium may further include instructions for causing one or more processors to perform operations including: receiving, by the control device, messages indicating a request to join a network from the one or more lighting fixtures upon initial power-up of the one or more lighting fixtures.

The non-transitory computer readable medium may further include instructions for causing one or more processors to perform operations including: delaying, by the control device, sending the first message in response to receiving a message from another control device. Messages transmitted by the control device and messages received by the control device from the one or more lighting fixtures may be Bluetooth Low Energy (BLE) advertisements.

Numerous benefits are achieved by way of the various embodiments over conventional techniques. For example, the various embodiments provide systems and methods that can be used to simplify commissioning intelligent lighting fixtures in lighting control systems. Since wireless communications are typically not confined to one room or area, lighting control systems that are commissioned using conventional wireless communication methods can be subject to joining unintended devices to a network. Embodiments of the present disclosure can use a wired connection of the intelligent lighting fixtures to the intelligent lighting controller to join only the intended devices to a mesh network. Wireless communication can then be performed between the intelligent lighting controller only the intelligent lighting fixtures joined to the mesh network. Embodiments according to the present disclosure can reduce installation time and simplify the configuration and testing process for an intelligent lighting control system. These and other advantages and features are described in more detail in conjunction with the text below and attached figures.

BRIEF DESCRIPTION OF THE DRAWINGS

Aspects and features of the various embodiments will be more apparent by describing examples with reference to the accompanying drawings, in which.

DETAILED DESCRIPTION

While certain embodiments are described, these embodiments are presented by way of example only, and are not intended to limit the scope of protection. The apparatuses, methods, and systems described herein may be embodied in a variety of other forms. Furthermore, various omissions, substitutions, and changes in the form of the example methods and systems described herein may be made without departing from the scope of protection.

In a conventional lighting system, power provided to lighting fixtures (or luminaires) may be controlled through a wall mounted switch, e.g., a wall station. The wall station may be a continuously powered wall station. A power source, for example, an AC power source may be connected to the wall station such that the wall station can interrupt power to the light fixtures to turn the light fixtures on and off. According to some aspects of the present disclosure, methods of forming a wireless mesh network for intelligent lighting devices may be provided. The wireless mesh network may be, for example, a Bluetooth Low Energy (BLE) wireless mesh network. The wireless mesh network may include an intelligent controller and a plurality of intelligent lighting fixtures, as well as other intelligent devices. The intelligent controller and intelligent lighting fixtures may be a retrofit for a conventional lighting system.

An intelligent lighting system may include, among other things, intelligent devices such as light fixtures, sensors (e.g., occupancy sensors or other sensors), wall stations (e.g., switches or other control devices), and distributed controllers embedded in the devices. Initial setup of the intelligent lighting system, also referred to herein as provisioning, involves associating light fixtures with control devices to form lighting networks. For example, light fixtures located in a particular room should be associated with a control device, for example a wall station located in the same room. In addition, the initial set up should exclude light fixtures and/or control devices that should not be part of a defined lighting network, such as light fixtures and control devices located in another room or floor. For example, signals from a wireless radio frequency (RF) lighting control system can penetrate walls and may cause light fixtures and/or control devices in adjacent rooms and/or floors to unintentionally become part of a lighting network.

Figure 1:
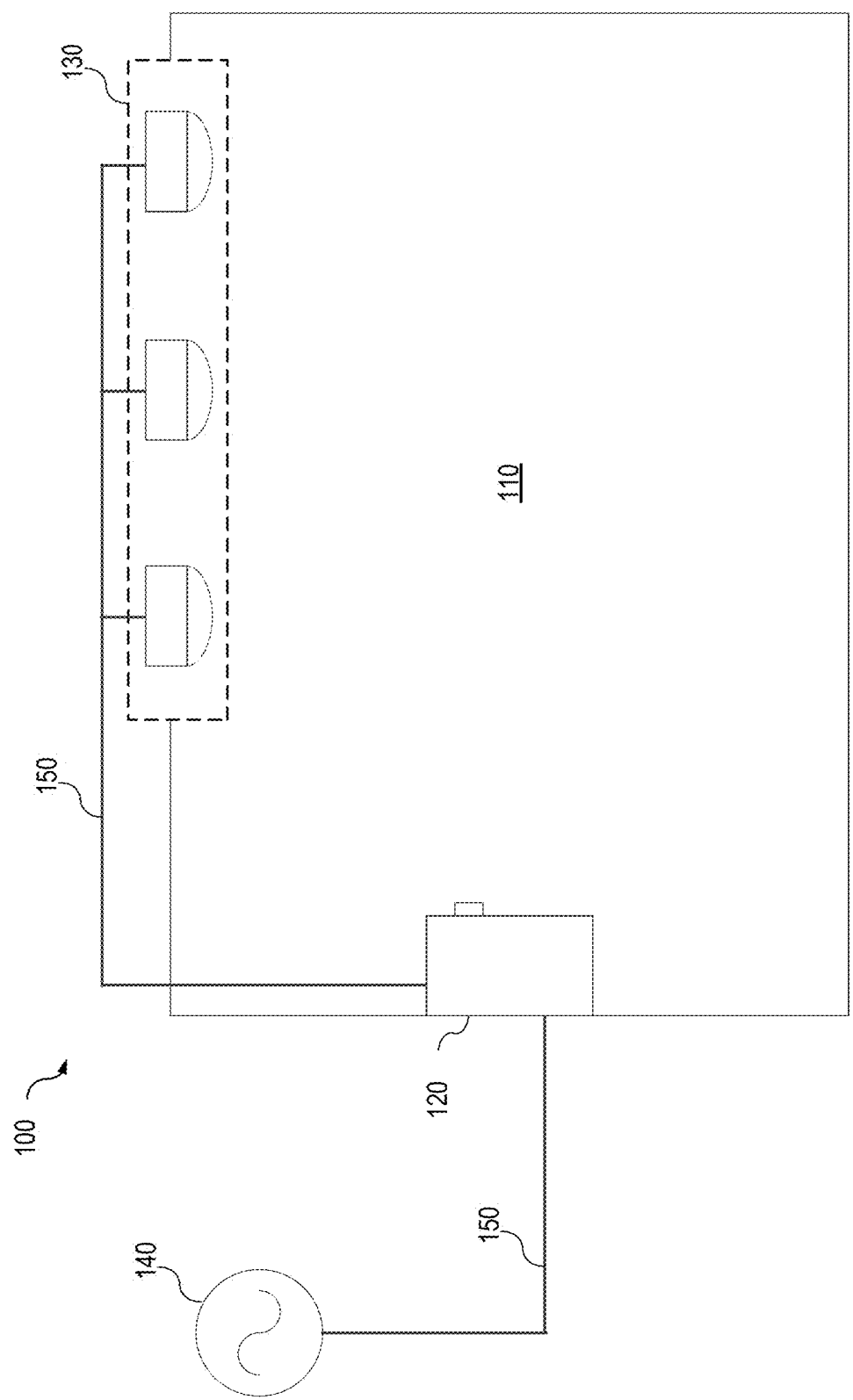
FIG. 1 is a diagram illustrating an example of an intelligent lighting system according to some aspects of the present disclosure.

FIG. 1 is a diagram illustrating an example of an intelligent lighting system 100 according to some aspects of the present disclosure. The intelligent lighting system 100 may include an intelligent lighting controller 120 and a plurality of intelligent lighting fixtures 130. In FIG. 1, the installation area is depicted as a room 110, but other implementations are possible. For example, the installation area may include an interior area of a building (e.g., rooms, hallways, maintenance areas), an exterior area (e.g., entryways, accent lighting), areas that are not associated with a building (e.g., parking lots, gardens), or any other suitable area or combination of areas in which an intelligent lighting system may be installed.

Each of the intelligent lighting fixtures 130 may be capable of providing programmable lighting effects. Examples of programmable lighting effects include, but are not limited to, dimming, color selection, correlated color selection, timed lighting, multiple scenes, or other suitable programmable lighting effects. In some cases, programmable lighting effects include effects that are provided based on input from one or more sensors, (e.g., occupancy sensors, ambient light sensors, temperature sensors, etc.). The intelligent lighting controller 120 may be capable of providing instructions to one or more of the intelligent lighting fixtures 130. For example, the intelligent lighting controller 120 may transmit instructions to the intelligent lighting fixtures 130 to provide a programmable lighting effect. In some cases, the intelligent lighting controller 120 may be configured to receive instructions describing the one or more programmable lighting effects. For example, the intelligent lighting controller 120 may receive instructions from a component in an intelligent lighting system (e.g., a central control panel, a security system). In some implementations, the intelligent lighting controller 120 may receive instructions from a mobile device executing an application. In some cases, the intelligent lighting controller 120 may transmit some or all of the received instructions to the intelligent lighting fixtures 130.

The intelligent lighting controller 120 and intelligent lighting fixtures 130 may be connected via electrical wiring 150. The electrical wiring 150 may include a neutral conductor and a "hot" conductor for carrying an alternating current (AC) power signal. The hot conductor may have an electric potential relative to the neutral conductor. The AC power source 140 may provide the AC power signal to the intelligent lighting controller 120. The electrical wiring 150 may conduct the AC power signal between the intelligent lighting controller 120 and each of the intelligent lighting fixtures 130. In some cases, the AC power signal may be considered a high-voltage power signal having a voltage that is suitable for powering a residential or business facility (e.g., 120 V, 240 V, 277V).

In some implementations, the intelligent lighting system 100 may be retrofit as an installation in which existing light fixtures and light switches are being replaced. For example, one or more of the intelligent lighting fixtures 130 may replace a previous lighting fixture that is incapable of providing a programmable lighting effect. In addition, the intelligent lighting controller 120 may replace a previous light switch that is incapable of providing digital instructions to a lighting fixture. In the example retrofit environment, the electrical wiring 150 may include legacy wiring, such as wiring present in the walls of the room 110 prior to replacement of a lighting fixture or lighting switch. The legacy electrical wiring 150 previously connecting each lighting fixture on a lighting circuit in the room 110 to a light switch may, after retrofit, connect each intelligent lighting fixtures 130 to the intelligent lighting controller 120.

Figure 2:
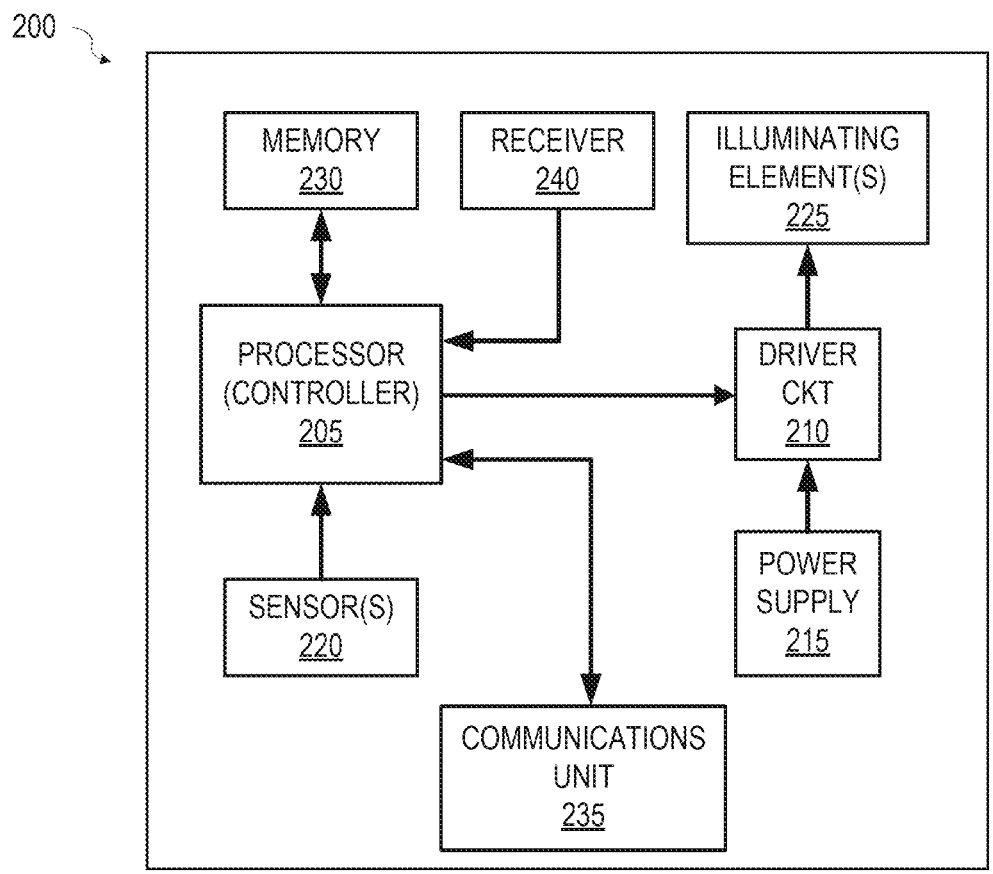
FIG. 2 is a block diagram illustrating an example of an intelligent lighting fixture according to some aspects of the present disclosure.

FIG. 2 is a block diagram illustrating an example of an intelligent lighting fixture 200 according to some aspects of the present disclosure. Referring to FIG. 2, the intelligent lighting fixture 200 may include an embedded controller or processor 205, driver circuitry 210, a power supply 215, one or more sensors 220, one or more illuminating element(s) 225, a memory 230, a communications unit 235, and a receiver 240. Each intelligent lighting fixture 200 may have its own unique media access control (MAC) address. The embedded controller or processor 205 may control overall operation of the intelligent light fixture 200. The embedded controller or processor 205 may be a microprocessor, microcomputer, computer, microcontroller, programmable controller, or other programmable device. The embedded controller or processor 205 may be part of a distributed lighting control network in which the controllers in each device communicate with each other without involvement of a central lighting controller. Alternatively, the embedded controller or processor 205 may communicate with a central lighting controller as part of a centrally controlled lighting control system.

The embedded controller or processor 205 may communicate with a memory 230. The memory 230 may be processor-readable solid state storage media, for example, but not limited to, RAM, ROM, EEPROM, FLASH memory, or other solid state storage devices that may be used to store desired program code in the form of instructions or data structures and that may be accessed by and/or operated upon by the embedded controller or processor 205.

The power supply 215 may supply power for the illuminating element(s) 225. The power supply 215 may be, for example, an AC-DC converter, a DC-DC converter, or an AC-AC converter. The power supply 215 may be included within a housing of the intelligent light fixture 200 or may be external to the intelligent light fixture 200. The embedded controller or processor 205 may provide control signals to the driver circuitry 210 to control the illumination characteristics of the illuminating element(s) 225. For example, the embedded controller or processor 205 may receive lighting control protocol input signals such as DMX512, DALI, ZIGBEE, Bluetooth® or other lighting control protocol and based on the input signals, generate the control signals to the driver circuitry 210. The driver circuitry 210 may control the power provided to the illuminating element(s) 225 from the power supply 215. In some implementations, the driver circuitry 210 and/or driver functions may be incorporated into the power supply 215 and the embedded controller or processor 205 may provide control signals to the power supply 215. Based on instructions received from the embedded controller or processor 205, the driver circuitry 210 may control lighting characteristics, for example, but not limited to, intensity, color temperature, color of light, or other lighting characteristic, produced by the illuminating element(s) 225. The illuminating element(s) 225 may be a light-emitting diode (LED), organic LED (OLED), a tunable fluorescent lamp, and/or other light emitting device(s).

The one or more sensors 220 may sense the motion of an occupant in the vicinity of the intelligent light fixture 200, for example in a room monitored by the one or more sensors 220. The one or more sensors 220 may include an occupancy sensor, for example, but not limited to, passive infrared (PIR) sensors, radar sensors, "time of flight" (TOF) sensors, (e.g., laser, radio, acoustic, etc.), and ultra-wideband (UWB) sensors. PIR sensors detect infrared radiation (i.e., radiant heat) emitted by or reflected from objects in their field of view. Doppler radar based occupancy sensors transmit a known continuous wave frequency and continuously detect reflections from objects within their field. TOF sensors measure the distance between the sensor and an object based on the time difference between the emission of the signal (e.g., an optical or acoustic signal) and its return to the sensor after being reflected by the object. UWB sensors use impulse radar techniques for emitting and sampling signal pulses to achieve accurate distance measurements determined by the time differences between transmitted and received pulses.

Other sensors that may be used include infrared (IR) sensors, ultrasonic sensors, audio sensor arrays, distance-based photoelectric sensors, radio frequency identification (RFID) tag readers, near field communication (NFC) tag readers, a Bluetooth® radio, a WiFi® radio from a mobile device carried by the occupant, or other ranging technology sensors capable of detecting the presence of an occupant near the light fixture and/or the distance of an occupant from the light fixture, or combinations thereof. In some implementations, these sensors may only detect motion or whether any occupant is near the fixture, while in other implementations the sensors may have sufficient resolution to be capable of detecting the number occupants within range of the sensor. Other variations of the intelligent light fixture 200 may be implemented without departing from the scope of the present disclosure. In some implementations, for example when a centralized sensor mounted on a wall or ceiling (i.e., one sensor communicating with the other devices of a lighting network in a room or other space) is used, the light fixture may not include one or more of the sensors 220 or one or more of the sensors included in the light fixture may be unused.

The communications unit 235 may enable the light fixture to communicate via a wired or wireless network. The communications unit 235 may represent one or more components that facilitate a network connection. In some implementations, the communications unit 235 may be a wireless communication device and can include wireless interfaces such as IEEE 802.11, Bluetooth, Bluetooth Low Energy (BLE), or other radio interfaces for accessing cellular telephone networks (e.g., transceiver/antenna for accessing a CDMA, GSM, UMTS, or other mobile communications network). In other implementations, the communication unit 235 may include a wired communication device and can include interfaces such as Ethernet, EIA RS-485, USB, IEEE 1394, or a fiber optic interface. In still other implementations, the communications unit 235 may include both wireless and wired communication devices.

The receiver 240 may monitor the AC power signal present on the hot conductor of the AC power lines. Based on the monitoring, the receiver 240 may detect an interruption of the AC power signal. For example, the receiver 240 may detect a power interruption of the AC power signal for a specified duration caused by an intelligent lighting controller (e.g., the intelligent lighting controller 120).

The intelligent lighting controller may be, for example, a wall station configured to provide control functions, for example, but not limited to, on-off switching, dimming, color control, etc., for light fixtures in a lighting network. Commands (e.g., on/off, dim, etc.) may be transmitted by the intelligent lighting controller (e.g., wall station) to the intelligent lighting fixtures in a lighting network.

Figure 3:
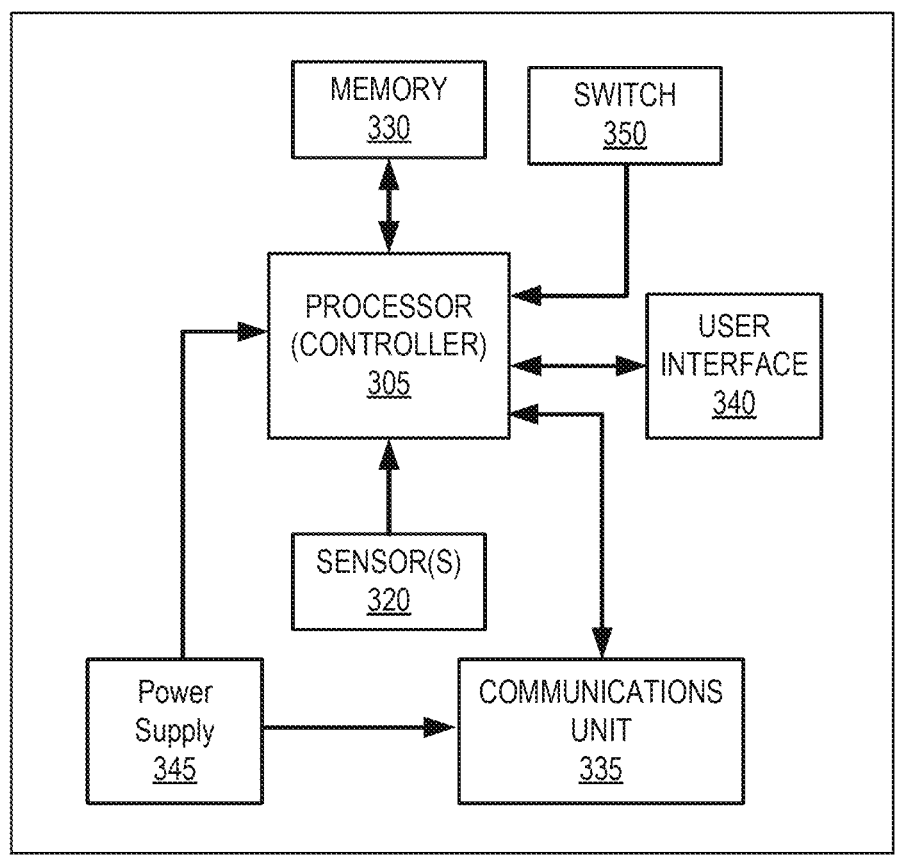
FIG. 3 is a block diagram illustrating an example of an intelligent lighting controller according to some aspects of the present disclosure.

FIG. 3 is a block diagram illustrating an example of an intelligent lighting controller 300 according to some aspects of the present disclosure. Referring to FIG. 3, the intelligent lighting controller 300 may include an embedded controller or processor 305, a memory 330, one or more sensors 320, a communications unit 335, a user interface 340, a power supply 345, and a switch 350. The embedded controller or processor 305, the memory 330, the one or more sensors 320, and the communications unit 335 may be configured similarly and operate similarly to the corresponding components of the intelligent lighting fixtures as previously described and descriptions will not be repeated here.

The intelligent lighting controller 300 may communicate wirelessly or over a wired connection via a communications unit 335 with intelligent lighting fixtures and/or sensors to form a lighting network. The intelligent lighting controller 300 may also provide programmable functionality (e.g., setting light levels, programming on-off times, etc.) for the devices in a lighting network.

The intelligent lighting controller 300 may include a user interface 340, for example, one or more buttons on a keypad and/or a touch screen or other user interface, to enable a user to input commands for controlling a lighting network. In some implementations, a software application, for example an application executing on a mobile device, may be operable to communicate with the intelligent lighting controller 300 to input commands to the intelligent lighting controller 300. The power supply 345 may receive power from the AC power lines and provide power for operation of the intelligent lighting controller 300.

The intelligent lighting controller 300 may be configured to transmit power from the AC power lines to the intelligent lighting fixtures in a lighting network. In some cases, the intelligent lighting controller 300 may include a switch 350 that is configured to interrupt transmission of the AC power signal transmitted on the hot conductor of the AC power lines. The switch 350 may include a transistor (e.g., MOSFET, BJT, IGBT, SiCFET), a relay, a thyristor, or other electrical component or combination of components configured to allow and prevent transmission of the AC power signal from the AC power lines to the intelligent lighting fixtures.

Figure 4:
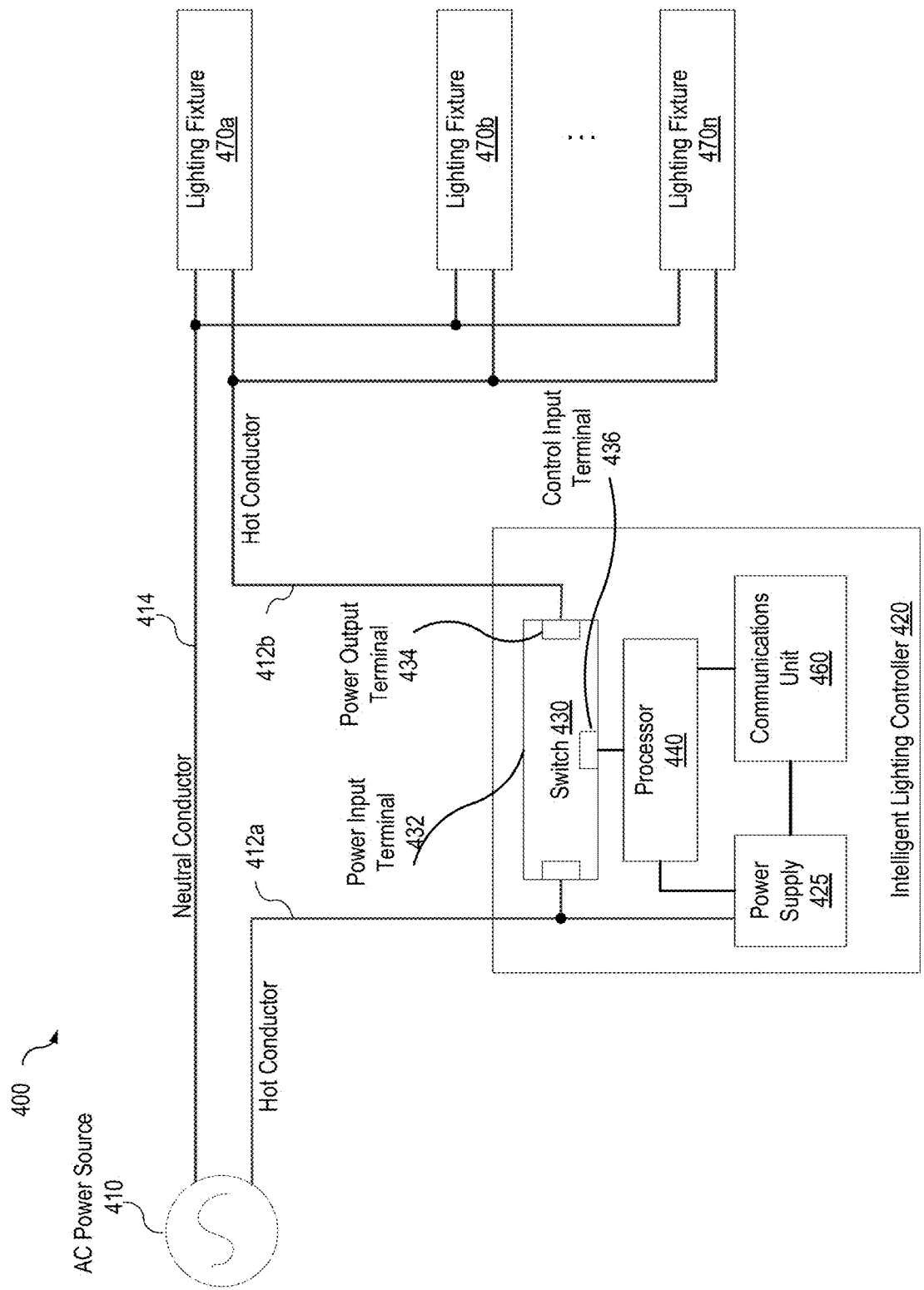
FIG. 4 is a diagram illustrating an example of an intelligent lighting network according to some aspects of the present disclosure.

FIG. 4 is a diagram illustrating an example of an intelligent lighting network 400 according to some aspects of the present disclosure. The intelligent lighting network 400 may be, for example, a BLE mesh network or other mesh network. Referring to FIG. 4, the intelligent lighting network 400 may include an intelligent lighting controller 420 and a one or more intelligent lighting fixtures 470a-470n. The intelligent lighting controller 420 may be, for example, the intelligent lighting controller 300 described with respect to FIG. 3. The intelligent lighting fixtures 470a-470n may be, for example, instances of the intelligent lighting fixture 200 described with respect to FIG. 2. The intelligent lighting network 400 may implement lighting models. The lighting models can allow control over the on/off state of the intelligent lighting fixtures, their lightness, color temperature, and their color (e.g., using various color spaces), etc. The lighting models may provide for a software-based intelligent lighting controller that can enable smart lighting automation scenarios.

Referring again to FIG. 4, an AC power source 410 may supply AC power to the intelligent lighting network 400. The AC power may be supplied via a first hot conductor 412a and a neutral conductor 414. The switch 430 may receive the AC power may be supplied from the first hot conductor 412a connected to a power input terminal 432, and may provide the AC power to the intelligent lighting fixtures 470a-470n from a power output terminal 434 connected to a second hot conductor 412b. The switch 430 of the intelligent lighting controller 420 may be configured to interrupt the AC power supplied to the intelligent lighting fixtures 470a-470n via the second hot conductor 412b. The switch 430 may interrupt the AC power based on a control signal provided to a control input terminal 436 by the processor 440.

According to some aspects of the present disclosure, a wireless mesh network, for example, a wireless BLE mesh network, may be formed and provisioned by an intelligent lighting controller having a wired connection to a plurality of intelligent lighting fixtures as described above with respect to FIG. 4. BLE advertisements from the intelligent lighting controller combined with a specifically timed power interrupt to the intelligent lighting fixtures can put the intelligent lighting fixtures into a provisioning mode. Additional BLE communications between the intelligent lighting controller and the intelligent lighting fixtures may enable the intelligent lighting fixtures to join the mesh network (e.g., be provisioned), as well as have initial configurations programmed by the intelligent lighting controller. Forming the wireless mesh network using the wired connection between the intelligent lighting controller and the intelligent lighting fixtures can prevent other intelligent lighting fixtures or devices, for example, lighting fixtures or devices in a different room, from unintentionally becoming part of the network. Further, the wireless mesh network may be formed without utilizing an external software application, for example, a software application executing on a mobile device.

The mesh network configuration can enable intelligent lighting fixtures or other intelligent devices that that are wired to the intelligent lighting controller but may be out of BLE transmission range (approximately 20-100 meters) of the intelligent lighting controller to join the network. The intelligent lighting controller may send additional BLE communications that may be transmitted through previously provisioned devices on the mesh network to other remote devices within their transmission range. When power is subsequently interrupted again by the intelligent lighting controller, the other remote devices may enter the provisioning mode and be provisioned by the intelligent lighting controller by communications transmitted via previously provisioned mesh network devices (e.g., previously provisioned intelligent lighting fixtures).

Figure 5:
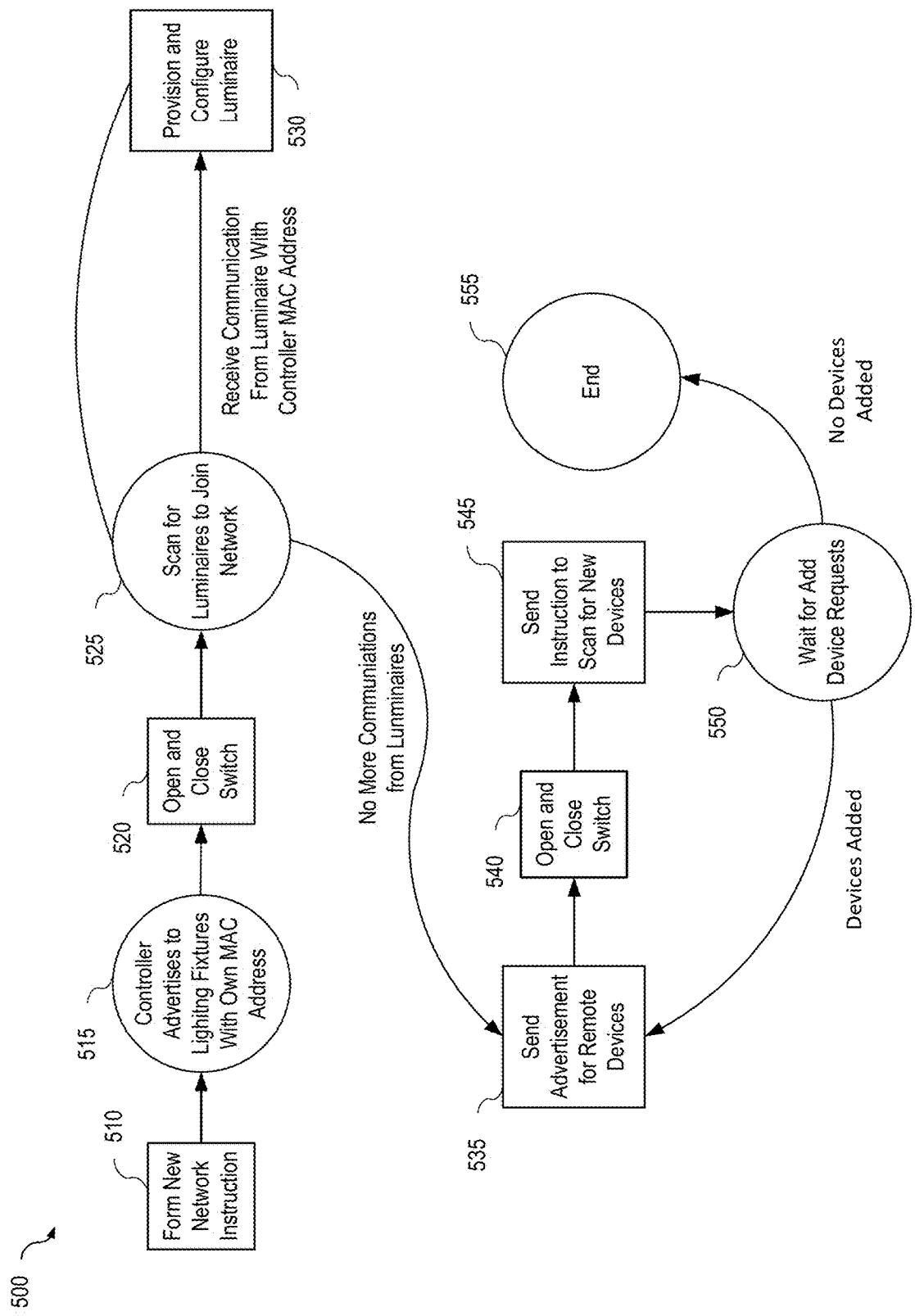
FIG. 5 is an example of a state diagram for an intelligent lighting controller for forming a mesh network according to some aspects of the present disclosure.

FIG. 5 is an example of a state diagram 500 for an intelligent lighting controller (e.g., the intelligent lighting controller 300 or 420) for forming a mesh network according to some aspects of the present disclosure. The intelligent controller may be, for example, a wall station or another control device. At block 510, the intelligent lighting controller may receive an instruction to form a new network. The instruction may be a button press of a designated button or switch of the intelligent lighting controller. Alternatively, the instruction may be a specified sequence of button or key presses on a user interface of the intelligent lighting controller. In some implementations, the instruction may be received wirelessly from a mobile device executing an application.

After receiving the instruction to form the network, at block 515, the intelligent lighting controller may transmit a BLE advertisement. The BLE advertisement may indicate that a power interrupt will occur and may include a unique media access control (MAC) address of the intelligent lighting controller. In some cases, the intelligent lighting controller may receive advertisements from another intelligent lighting controller, for example an intelligent controller in another room, that is about to initiate a power interrupt. In such cases, the intelligent controller that receives the advertisements may delay, e.g., may backoff, sending its advertisements to avoid cross-pairing devices. The intelligent lighting fixtures may be configured, upon initial power-up, to listen for the BLE advertisement from the intelligent lighting controller. The intelligent lighting controller may transmit the BLE advertisement a specified number of times, for example, three or another number of times.

At block 520, within a specified period of time, for example, 200 ms or another period of time, after transmitting the final BLE advertisement, the intelligent lighting controller may interrupt power to the intelligent lighting fixtures and/or other intelligent devices that are wired to the intelligent lighting controller. The processor (e.g., the processor 440) may provide a control signal to the switch (e.g., the switch 430) to interrupt the power provided through the switch to the intelligent lighting fixtures. The processor may cause the switch to interrupt power for a specified period of time by opening and closing the switch.

Figure 6:
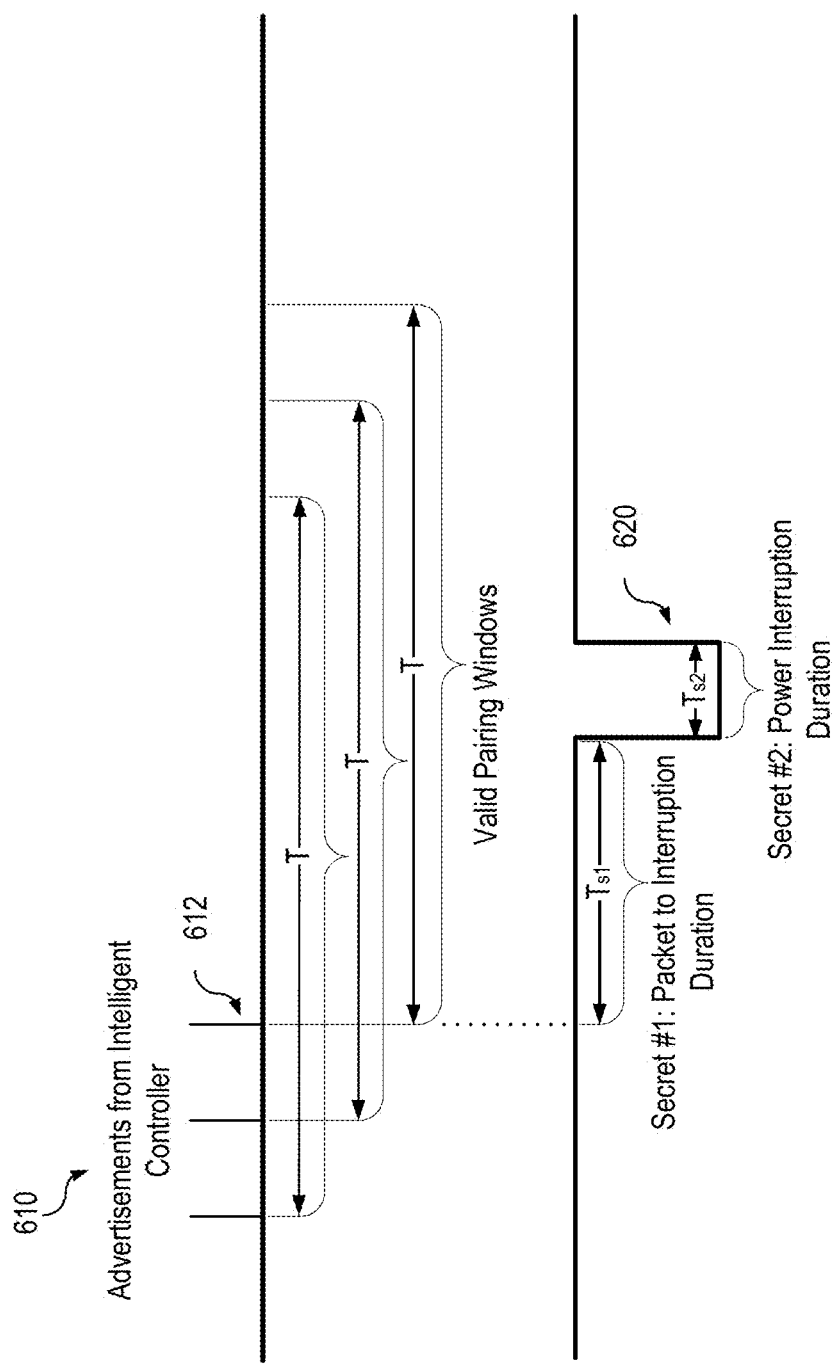
FIG. 6 is a diagram illustrating an example of the timing of the BLE advertisement from the intelligent lighting controller and the power interrupt according to some aspects of the present disclosure.

FIG. 6 is a diagram illustrating an example of the timing of the BLE advertisement from the intelligent lighting controller and the power interrupt according to some aspects of the present disclosure. As shown in FIG. 6, the intelligent lighting controller (e.g., the intelligent lighting controller 420) may transmit the specified number of BLE advertisements 610 indicating that a power interrupt will occur.

Each advertisement may have an associated time period or pairing window, T, during which the advertisement is valid. The pairing window T may have a specified duration, for example, 200 ms or another duration. After the final advertisement 612 is transmitted by the intelligent lighting controller, the power interrupt 620 may occur. For example, the processor (e.g., the processor 440) of the intelligent lighting controller may transmit a control signal to the switch (e.g., the switch 430) in the intelligent lighting controller to cause the switch to interrupt power to the intelligent lighting fixtures for a specified time duration. The timing of the power interrupt 620 may be such that it occurs within an overlapping portion of the pairing window durations for the specified number of advertisements.

In some implementations, the time duration $T_{s1}$ between the last advertisement from the intelligent controller and the beginning of the power interrupt duration may be utilized as a first "secret" known to the network devices that received the advertisement and sensed the power interrupt. Similarly, the power interrupt duration $T_{s1}$ may be utilized as a second secret. The first and second secrets may be employed to prevent other devices that do not know the secrets from joining the network.

Returning to FIG. 5, the power interrupts sensed by the intelligent lighting fixtures within the specified period of time of receiving the BLE advertisement from the intelligent lighting controller may cause the intelligent lighting fixtures to enter a provisioning mode. After sensing the power interrupt, the intelligent lighting fixtures that have entered the provisioning mode may transmit BLE advertisements that include the MAC address of the intelligent lighting controller.

At block 525, the intelligent lighting controller may scan for the BLE advertisements from the intelligent lighting fixtures within the BLE transmission range of the intelligent lighting controller that have entered the provisioning mode. Upon receiving a BLE advertisement that includes its own MAC address as well as a MAC address of an intelligent lighting fixture, at block 530, the intelligent lighting controller may transmit BLE communications to the intelligent light fixture to provision the intelligent light fixture to enable the intelligent light fixture to join the mesh network. The intelligent lighting controller may make a specified number of attempts, for example, three attempts, to provision an intelligent lighting fixture before continuing to scan for additional BLE advertisements. After provisioning an intelligent light fixture, the intelligent lighting controller may also transmit additional BLE communications to provide an initial configuration (e.g., on/off controls, light intensity, etc.) for the intelligent lighting controller. The intelligent lighting controller may continue scanning for BLE advertisements and provisioning/configuring intelligent lighting fixtures until no further BLE advertisements are received from intelligent light fixtures.

At block 535, the intelligent lighting controller may begin the process of provisioning remote intelligent lighting fixtures. Remote intelligent lighting fixtures are intelligent lighting fixtures that are outside of the BLE transmission range of the intelligent lighting controller. The intelligent lighting controller may transmit a BLE advertisement indicating that another power interrupt will occur. The BLE advertisement may include instructions to the previously provisioned intelligent light fixtures to retransmit the BLE advertisement, including the MAC address of the intelligent lighting controller. The BLE advertisement retransmitted by the previously provisioned intelligent light fixtures may be received by remote intelligent light fixtures.

At block 540, intelligent lighting controller may again interrupt power via the wiring through the switch, and the power interrupt may be sensed by the remote intelligent lighting fixtures within the specified period of time of receiving the BLE advertisement, causing them to enter the provisioning mode. At block 545, the intelligent lighting controller may send a BLE instruction to the previously provisioned intelligent lighting fixtures to scan for the BLE advertisements from the remote intelligent lighting fixtures that have entered the provisioning mode. Intelligent lighting fixtures within the BLE transmission range of the intelligent lighting controller that failed to be provisioned may reenter the provisioning mode and may transmit BLE advertisements that include the MAC address of the intelligent lighting controller.

At block 550, the intelligent lighting controller may wait for requests for new devices to be added to the network. Upon receiving a BLE advertisement from a previously provisioned intelligent lighting fixture that includes an add device request from a remote intelligent lighting fixture, the intelligent lighting controller may transmit BLE communications to the remote intelligent lighting fixture via the previously provisioned intelligent lighting fixtures to provision/configure the remote intelligent lighting fixture.

The previously provisioned intelligent lighting fixtures may continue scanning for BLE advertisements and the intelligent lighting controller may continue provisioning/configuring remote intelligent lighting fixtures until no further BLE advertisements are received from remote intelligent light fixtures. The remote provisioning process (e.g., BLE advertisement, power interrupt, provisioning/configuring) may be repeated a specified number of times, for example, four or another number of times, to ensure that even the most remote intelligent lighting fixtures and/or devices have been provisioned. At block 555, the provisioning process may end when no further devices are available to be added.

Figure 7:
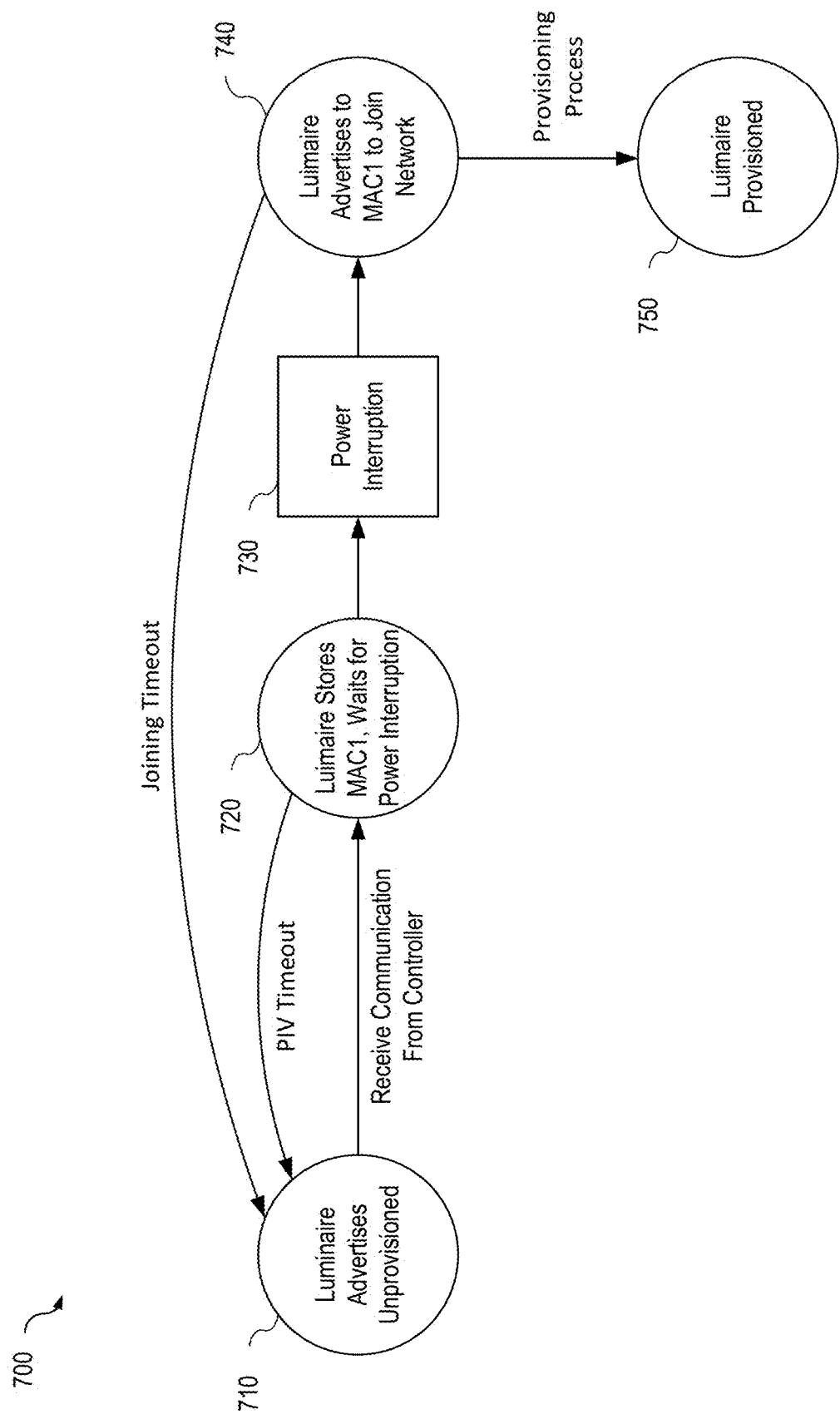
FIG. 7 is a state diagram for an example of an intelligent lighting fixture according to some aspects of the present disclosure.

FIG. 7 is an example of a state diagram 700 for an intelligent lighting fixture (e.g., the intelligent lighting fixture 200 or 470*a*-470*n*) for forming a mesh network according to some aspects of the present disclosure. Referring to FIG. 7, at block 710, upon initial power up, the intelligent lighting fixture may transmit a BLE advertisement indicating that it is not provisioned, and may scan for a BLE advertisement from an intelligent lighting controller.

At block 720, the intelligent lighting fixture may receive a BLE advertisement from the intelligent lighting controller. The BLE advertisement from the intelligent lighting controller may include a MAC address of the intelligent controller, and may indicate that a power interrupt will occur. The intelligent lighting fixture may store the MAC address of the intelligent lighting controller in its memory and wait a specified period of time, for example, 200 ms or another period of time, for the power interrupt. A timer may be implemented, for example, by the processor of the intelligent lighting fixture or by another timer to determine the specified period of time. If the power interrupt is not sensed by the intelligent lighting fixture within the specified period of time, a timeout may occur and the intelligent light fixture may again advertise that it is not provisioned.

In some cases, the intelligent lighting fixture may receive conflicting advertisements, e.g., an advertisement containing a different MAC address, from another intelligent lighting controller, for example an intelligent controller in another room, that is about to initiate a power interrupt. In such cases, the intelligent lighting fixture may ignore the advertisements from both intelligent lighting controllers. The intelligent lighting fixture may continue transmitting BLE advertisements indicating that it is not provisioned, and may scan for a subsequent BLE advertisement from an intelligent lighting controller. The intelligent lighting fixture may continue to ignore conflicting intelligent lighting controller advertisements and transmit its own BLE advertisements until advertisements from only one intelligent lighting controller are received.

At block 730, the power interrupt may occur. At block 740, after sensing the power interrupt, the intelligent lighting fixture may enter a provisioning mode, and may advertise via BLE communication to join the network. For example, the processor of the intelligent lighting fixture may sense the power interrupt and cause the communications unit to transmit BLE advertisements indicating that the intelligent lighting fixture wants to join the network of the intelligent lighting controller. The advertisement may include the MAC address of the intelligent lighting controller. If the intelligent lighting controller fails to respond to the advertisement from the intelligent lighting fixture or the communication fails or another reason, a joining timeout may occur and the intelligent lighting fixture may again advertise that it is not provisioned.

At block 750, if the intelligent lighting controller responds to the advertisement from the intelligent lighting fixture, the intelligent lighting controller may communicate via BLE communications with the intelligent lighting fixture to join the intelligent lighting fixture to the mesh network.

Figure 8:
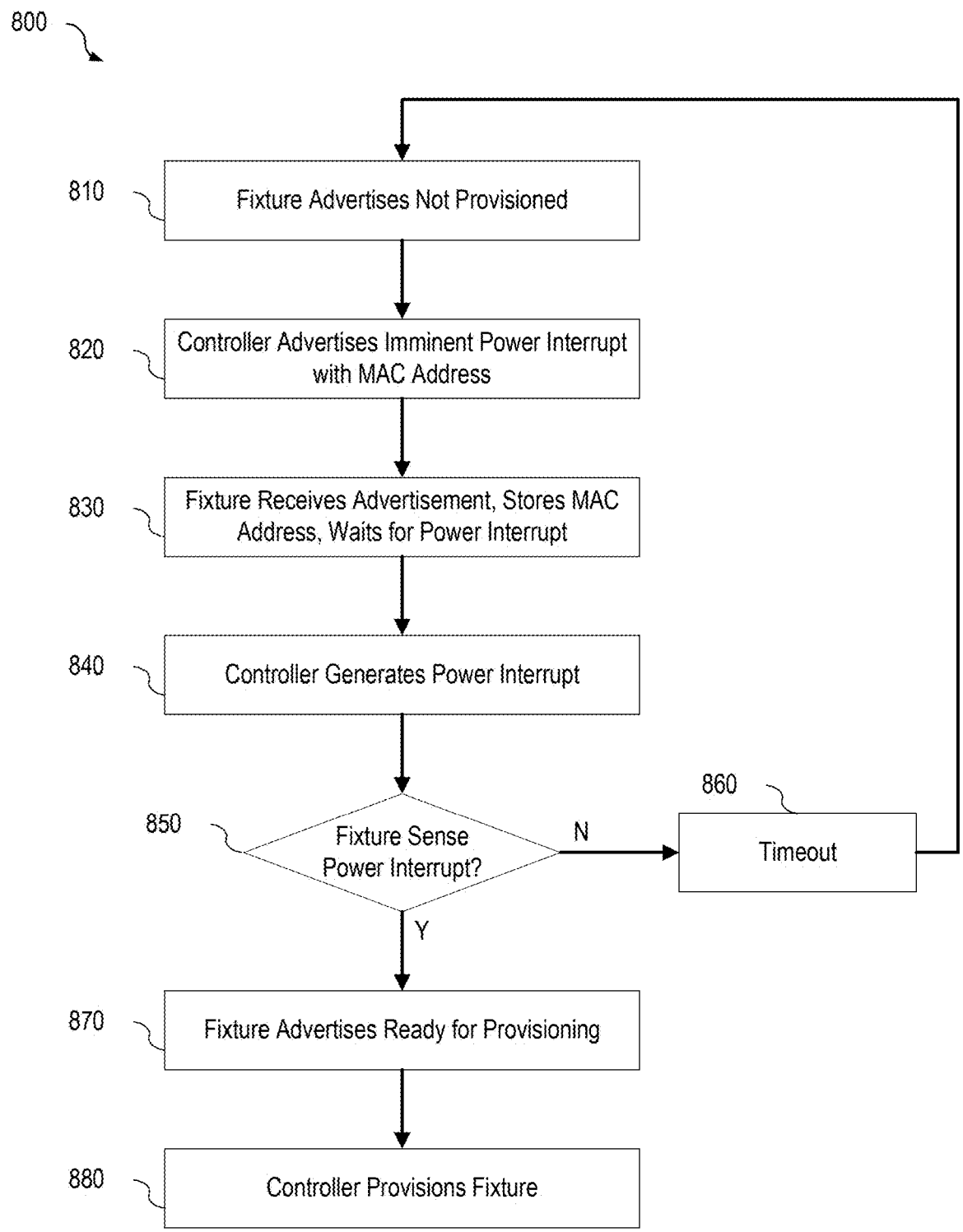
FIG. 8 is a flowchart illustrating an example of a method for forming a mesh network of intelligent lighting devices according to some aspects of the present disclosure.

FIG. 8 is a flowchart illustrating an example of a method for forming a mesh network of intelligent lighting devices according to some aspects of the present disclosure. Referring to FIG. 8, at block 810, the intelligent lighting fixture may advertise that it is not provisioned. Upon its first power-up, the intelligent lighting fixture may transmit BLE advertisements indicating that it is not provisioned. The intelligent lighting fixture may listen for BLE advertisements from the intelligent lighting controller that a power interrupt is imminent.

At block 820, the intelligent lighting controller may include its MAC address in an advertisement that a power interrupt is imminent. The intelligent lighting controller may transmit a specified number of BLE advertisements indicating that a power interrupt is imminent. For example, the intelligent lighting controller may transmit the BLE advertisements three times or another number of times. Each advertisement may have an associated time period or pairing window, T, during which the advertisement is valid. The pairing window T may have a specified duration, for example, 200 ms or another duration.

At block 830, the intelligent lighting fixture may receive the BLE advertisements, store the MAC address, and wait for the power interrupt. Upon receiving the advertisements from the intelligent lighting controller, the intelligent lighting fixture may store in its memory the MAC address of the intelligent lighting controller included in the advertisements. The intelligent lighting fixture may wait a specified period of time (e.g., the pairing window) after receiving the advertisements for the power interrupt indicated in the advertisements.

At block 840, the intelligent lighting controller may generate a power interrupt to the intelligent lighting fixture. For example, the processor (e.g., the processor 440) of the intelligent lighting controller may transmit a control signal to the switch (e.g., the switch 430) in the intelligent lighting controller to cause the switch to interrupt power to the intelligent lighting fixture for a specified time duration. The timing of the power interrupt may be such that it occurs within an overlapping portion of the pairing window durations for the specified number of advertisements.

At block 850, it may be determined whether the intelligent lighting fixture sensed the power interrupt. For example, the processor of the intelligent lighting fixture may sense the power interrupt. In response to determining that the intelligent lighting fixture did not sense the power interrupt (850-N), at block 860, the specified time period (e.g., the pairing window) may timeout. A timer may be implemented, for example, by the processor of the intelligent lighting fixture or by another timer to determine that the pairing window timed out. At block 810, the intelligent lighting fixture may again advertise that it is not provisioned.

In response to determining that the intelligent lighting fixture did sense the power interrupt (850-Y), at block 870, the intelligent lighting fixture may enter a provisioning mode, and may advertise via BLE communication to join the network. For example, the processor of the intelligent lighting fixture may sense the power interrupt and cause the communications unit to transmit BLE advertisements indicating that the intelligent lighting fixture wants to join the mesh network of the intelligent lighting controller. The advertisement may include the MAC address of the intelligent lighting controller.

At block 880, the intelligent lighting controller may communicate via BLE communications with the intelligent lighting fixture to join the intelligent lighting fixture to the mesh network (e.g., provision the intelligent lighting fixture). The intelligent lighting fixture may then be configured by the intelligent lighting controller to interoperate with the intelligent lighting controller. Once an intelligent lighting fixture has joined the mesh network (e.g., has been provisioned), a specific power cycle sequence generated by the intelligent lighting controller may enable the intelligent lighting fixture to be removed from the network and again transmit BLE advertisements to join a network.

The method 800 may be embodied on a non-transitory computer readable medium known to those of skill in the art, having stored therein a program including computer executable instructions for making a processor, computer, or other programmable device execute the operations of the method.

The specific operations illustrated in FIG. 8 provide a particular method for forming a mesh network of intelligent lighting devices according to an embodiment of the present disclosure. Other sequences of operations may also be performed according to alternative embodiments. For example, alternative embodiments of the present disclosure may perform the operations outlined above in a different order. Moreover, the individual steps illustrated in FIG. 8 may include multiple operations that may be performed in various sequences as appropriate to the individual step. Furthermore, additional operations may be added or removed depending on the particular applications.

Figure 9:
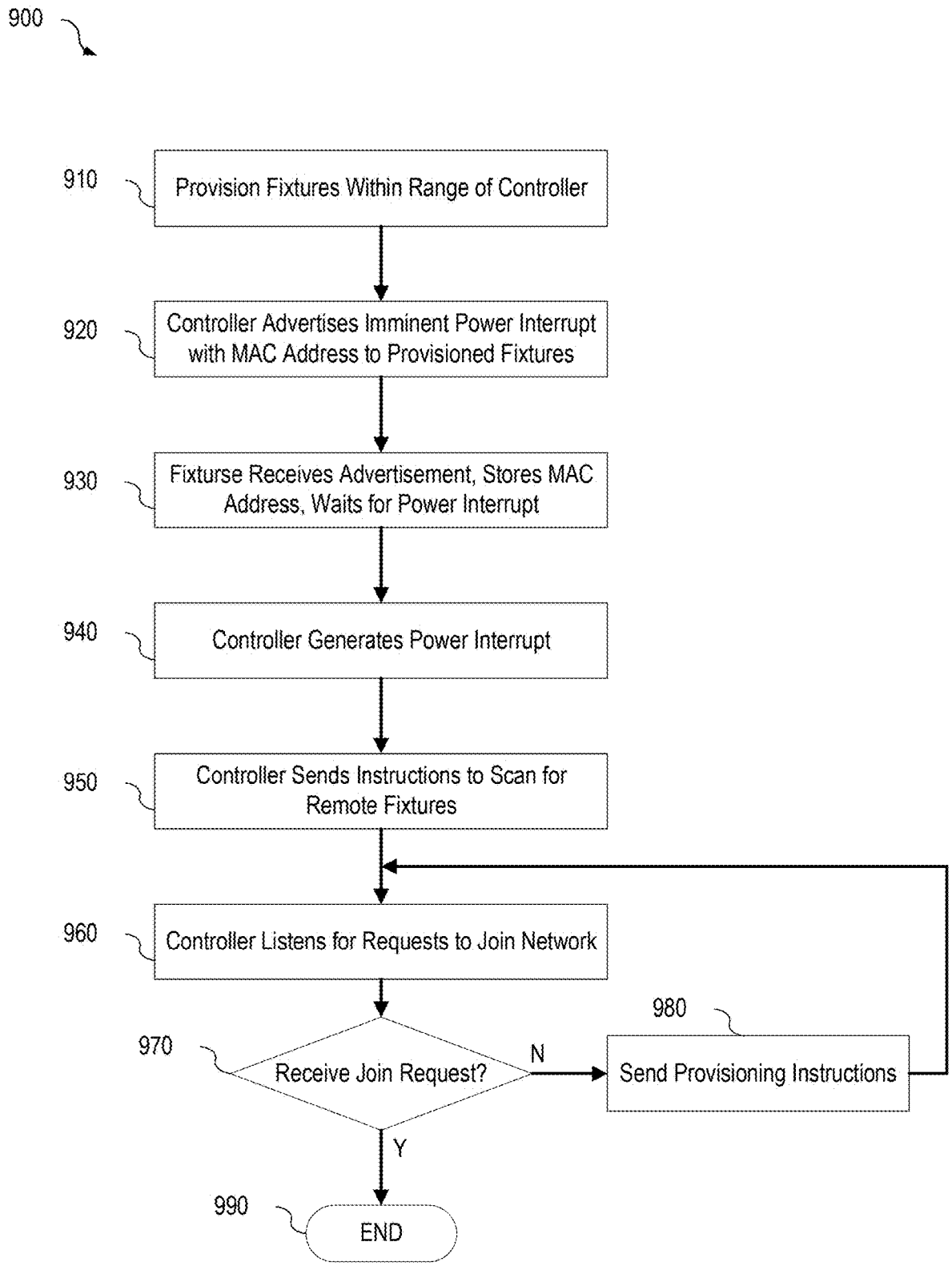
FIG. 9 is a flowchart illustrating an example of a method for remotely provisioning intelligent lighting devices for a mesh network according to aspects of the present disclosure.

FIG. 9 is a flowchart illustrating an example of a method for remotely provisioning intelligent lighting devices for a mesh network according to some aspects of the present disclosure. Referring to FIG. 9, at block 910, intelligent lighting fixtures within range of the intelligent lighting controller may be provisioned. The intelligent lighting controller may transmit BLE advertisements, generate power interrupts, and provision intelligent lighting fixtures within the BLE transmission range of the intelligent lighting controller according to the method of FIG. 8.

At block 920, the intelligent lighting controller may transmit a BLE advertisement indicating that a power interrupt is imminent to the provisioned intelligent lighting fixtures. The BLE advertisement may include its MAC address. The intelligent lighting controller may transmit a specified number of BLE advertisements indicating that a power interrupt is imminent. For example, the intelligent lighting controller may transmit the BLE advertisements three times or another number of times. Each advertisement may have an associated time period or pairing window, T, during which the advertisement is valid. The pairing window T may have a specified duration, for example, 200 ms or another duration.

At block 930, the provisioned intelligent lighting fixtures may receive the BLE advertisements, store the MAC address, and wait for the power interrupt. Upon receiving the advertisements from the intelligent lighting controller, the intelligent lighting fixture may store in its memory the MAC address of the intelligent lighting controller included in the advertisements. Since each intelligent lighting fixtures may include its own embedded controller, the advertisements from the intelligent lighting controller may instruct the embedded controllers of the provisioned intelligent lighting fixtures to cause the advertisements from the intelligent lighting controller to be retransmitted to extend the mesh network. The provisioned intelligent lighting fixtures may retransmit the advertisements from the intelligent lighting controller such that the advertisements may reach remote intelligent lighting fixtures that may be out of BLE communication range with the intelligent lighting controller. The intelligent lighting fixtures may wait a specified period of time (e.g., the pairing window) after receiving the advertisements for the power interrupt indicated in the advertisements.

At block 940, the intelligent lighting controller may generate a power interrupt to the intelligent lighting fixtures. For example, the processor (e.g., the processor 440) of the intelligent lighting controller may transmit a control signal to the switch (e.g., the switch 430) in the intelligent lighting controller to cause the switch to interrupt power to the intelligent lighting fixtures for a specified time duration. The timing of the power interrupt may be such that it occurs within an overlapping portion of the pairing window durations for the specified number of advertisements.

At block 950, the intelligent lighting controller may transmit a BLE communication to the provisioned intelligent lighting fixtures to scan for BLE communications from remote intelligent lighting fixtures indicating that the remote intelligent lighting fixtures want to join the mesh network of the intelligent lighting controller. At initial power-up, the remote intelligent lighting fixtures may begin transmitting BLE advertisements to join the network, but may be out of BLE communication range with the intelligent lighting controller; therefore, the remote intelligent lighting fixtures may continue to advertise to join the network.

At block 960, the intelligent lighting controller may listen for requests to join the network. The intelligent lighting controller may listen for BLE communications from remote intelligent lighting fixtures that have been received and relayed to the intelligent lighting controller from the previously provisioned intelligent lighting fixtures.

At block 970, it may be determined whether any requests to join the mesh network have been received. The intelligent lighting controller may listen for BLE communications from the previously provisioned intelligent lighting fixtures. The previously provisioned intelligent lighting fixtures may listen for BLE communications containing the MAC address of the intelligent lighting controller and requesting to join the network from remote intelligent lighting fixtures. The intelligent lighting controller may determine whether a network joining request contains its MAC address indicating that the request is valid. In response to determining that requests to join the mesh network have been received (970-Y), at block 980, the intelligent lighting controller may communicate via BLE communications with the remote intelligent lighting fixture via the previously provisioned intelligent lighting fixtures to join the remote intelligent lighting fixture to the mesh network (e.g., provision the intelligent lighting fixture).

The remote intelligent lighting fixture may then be configured by the intelligent lighting controller via the previously provisioned intelligent lighting fixtures to interoperate with the intelligent lighting controller. Once a remote intelligent lighting fixture has joined the mesh network (e.g., has been provisioned), a specific power cycle sequence generated by the intelligent lighting controller may enable the remote intelligent lighting fixture to be removed from the network and again transmit BLE advertisements to join a network. Thus, a series of power interruptions implemented by the intelligent lighting controller can form a mesh network. In some implementations, the timing and number of the power interruptions may represent a secret that may be used as a challenge to intelligent lighting fixtures attempting to join the mesh network.

In response to determining that requests to join the mesh network have not been received (970-N), at block 990, the process may end.

The method 900 may be embodied on a non-transitory computer readable medium known to those of skill in the art, having stored therein a program including computer executable instructions for making a processor, computer, or other programmable device execute the operations of the method.

The specific operations illustrated in FIG. 9 provide a particular method for remotely provisioning intelligent lighting devices for a mesh network according to an embodiment of the present disclosure. Other sequences of operations may also be performed according to alternative embodiments. For example, alternative embodiments of the present disclosure may perform the operations outlined above in a different order. Moreover, the individual steps illustrated in FIG. 8 may include multiple operations that may be performed in various sequences as appropriate to the individual step. Furthermore, additional operations may be added or removed depending on the particular applications.

The examples and embodiments described herein are for illustrative purposes only. Various modifications or changes in light thereof will be apparent to persons skilled in the art. These are to be included within the spirit and purview of this application, and the scope of the appended claims, which follow.

What is claimed is:

1. A system comprising:
a control device; and
a plurality of lighting fixtures configured to receive power through the control device, each lighting fixture of the plurality of lighting fixtures including:
a receiver; and
a memory,
each lighting fixture of the plurality of lighting fixtures configured to:
scan for a first message transmitted by the control device, the first message containing a unique identifier of the control device;
receive the first message and store the unique identifier of the control device in the memory;
sense a power interrupt to the lighting fixture initiated by the control device within a specified period of time after receipt of the first message from the control device; and
transmit a second message including the unique identifier of the control device, the second message indicating that the lighting fixture is in a provisioning mode,
wherein the control device is further configured to provision the plurality of lighting fixtures to form a mesh network.

2. The system of claim 1, wherein the unique identifier is a Media Access Control (MAC) address of the control device.

3. The system of claim 1, wherein upon an initial power-up, each lighting fixture of the plurality of lighting fixtures transmits messages indicating a request to join a network.

4. The system of claim 1, wherein messages transmitted by the control device and messages transmitted by the plurality of lighting fixtures are Bluetooth Low Energy (BLE) advertisements.

5. The system of claim 1, wherein the control device is configured to delay sending the first message in response to receiving a message from another control device.

6. The system of claim 1, wherein the control device is a continuously powered wall station.

7. The system of claim 6, wherein transmission of the first message to the plurality of lighting fixtures is initiated by a specified user input to a user interface of the continuously powered wall station.

8. The system of claim 1, wherein each lighting fixture is configured to determine a value of a time duration between receiving the first message and initiation of the power interrupt, store the value in the memory, and transmit the value to the control device as a requirement to join the mesh network.

9. The system of claim 1, wherein each lighting fixture within communication range of the control device are further configured to extend the mesh network by retransmitting messages received from the control device to remote lighting fixtures outside the communication range of the control device.

10. The system of claim 1, wherein the control device comprises:
a switch configured to receive power from a power source; and
a controller configured to communicate with the switch, the controller further configured to generate control signals to the switch to cause the switch to supply and interrupt the power to the plurality of lighting fixtures.

11. A method, comprising:
scanning, by one or more lighting fixtures, for a first message transmitted by a control device, the first message containing a unique identifier of the control device;
receiving, by the one or more lighting fixtures, the first message and storing the unique identifier of the control device in a memory;

sensing, by the one or more lighting fixtures, a power interrupt initiated by the control device within a specified period of time after receipt of the first message from the control device;

transmitting, by the one or more lighting fixtures, a second message including the unique identifier of the control device, the second message indicating that the lighting fixture is in a provisioning mode; and provisioning, by the control device, the one or more lighting fixtures to form a mesh network.

12. The method of claim 11, further comprising:

transmitting, by the one or more lighting fixtures upon initial power-up, messages indicating a request to join a network.

13. The method of claim 11, wherein messages transmitted by the control device and messages transmitted by the one or more lighting fixtures are Bluetooth Low Energy (BLE) advertisements.

14. The method of claim 11, further comprising:

receiving, by the control device, a specified user input to initiate transmission of the first message.

15. The method of claim 11, further comprising:

initiating the first message transmitted by the control device in response to a specified user input to a user interface of the control device.

16. The method of claim 11, further comprising:

delaying, by the control device, sending the first message in response to receiving a message from another control device.

17. A non-transitory computer readable medium having stored therein instructions for making one or more processors execute a method for provisioning lighting fixtures, the processor executable instructions comprising instructions for performing operations including:

transmitting, by a control device, a first message containing a unique identifier of the control device;

initiating, by the control device, a power interrupt to one or more lighting fixtures;

receiving, by the control device, a second message including the unique identifier of the control device from each of the one or more lighting fixtures, the second message indicating that each of the lighting fixtures is in a provisioning mode; and provisioning, by the control device, the one or more lighting fixtures to form a mesh network.

18. The non-transitory computer readable medium as defined in claim 17, further comprising instruction for performing operations including:

receiving, by the control device, messages indicating a request to join a network from the one or more lighting fixtures upon initial power-up of the one or more lighting fixtures.

19. The non-transitory computer readable medium as defined in claim 17, further comprising instruction for performing operations including:

delaying, by the control device, sending the first message in response to receiving a message from another control device.

20. The non-transitory computer readable medium as defined in claim 17, wherein messages transmitted by the control device and messages received by the control device from the one or more lighting fixtures are Bluetooth Low Energy (BLE) advertisements.

* * * * *